US010628549B2

(12) United States Patent
Berkens

(10) Patent No.: US 10,628,549 B2
(45) Date of Patent: Apr. 21, 2020

(54) AUTOMATION GENERATION OF TEST LAYOUTS FOR VERIFYING A DRC DECK

(71) Applicant: Sage Design Automation LTD., Haifa (IL)

(72) Inventor: Martinus Maria Berkens, Eindhoven (NL)

(73) Assignee: SAGE DESIGN AUTOMATION LTD, Haifa (IL)

( * ) Notice: Subject to any disclaimer, the term of this patent is extended or adjusted under 35 U.S.C. 154(b) by 109 days.

(21) Appl. No.: 15/565,882

(22) PCT Filed: Apr. 15, 2015

(86) PCT No.: PCT/IB2015/052734
§ 371 (c)(1),
(2) Date: Oct. 11, 2017

(87) PCT Pub. No.: WO2016/166571
PCT Pub. Date: Oct. 20, 2016

(65) Prior Publication Data
US 2018/0107781 A1 Apr. 19, 2018

(51) Int. Cl.
*G06F 17/50* (2006.01)
*G06F 11/36* (2006.01)
*G01R 31/317* (2006.01)

(52) U.S. Cl.
CPC ... *G06F 17/5081* (2013.01); *G01R 31/31704* (2013.01); *G06F 11/3684* (2013.01); *G06F 2217/02* (2013.01); *G06F 2217/06* (2013.01)

(58) Field of Classification Search
USPC ......................................... 716/136
See application file for complete search history.

(56) References Cited

U.S. PATENT DOCUMENTS

2007/0157153 A1\* 7/2007 Croffie ................ G06F 17/5072
716/52
2008/0109772 A1 5/2008 Pokorny
2015/0324510 A1\* 11/2015 Aggarwal .......... G06F 17/5081
716/112

FOREIGN PATENT DOCUMENTS

CN 10169803 4/2008
EP 2728499 10/2012
(Continued)

OTHER PUBLICATIONS

Kahng et al. (2008) "Predictive Modeling of Lithography-Induced Linewidth Variation" 14 pages.
(Continued)

*Primary Examiner* — Eric D Lee
(74) *Attorney, Agent, or Firm* — Adsero IP

(57) ABSTRACT

A computer-implemented method for automated generation of test layouts for verifying a DRC deck. The method comprises receiving a first layout (L1) comprising one or more polygon shapes (P1) defined by a plurality of polygon parameters (W1,H1). Design rules (R1,R2) are received comprising inequality constraints (C) on the polygon parameters (W1,H1). A second layout (L2) is calculated by applying a random change ($\Delta$W12) of value to at least one of the polygon parameters (W1) of the first layout (L1). A third layout (L3) is calculated by varying values of the polygon parameters (W1,H1) of the second layout (L2) until a respective slack (S1,S2) of the polygon parameters (W1,H1) with respect to one or more of the parameter boundaries (B1,B2) defined by the constraints is minimized. The third layout (L3) may be stored as candidate test layout.

18 Claims, 9 Drawing Sheets

(56) References Cited

FOREIGN PATENT DOCUMENTS

TW 201423460 6/2014
WO WO 2014 163519 A1 10/2014

OTHER PUBLICATIONS

Zhang et al. (2015) "Application of Layout DOE in RET Flow" 9 pages.
O'Brien et al. (2015) "OPC on Real World Circuitry" 9 pages.
Taiwan Official Action, (Taiwan Application No. 105111647) dated Dec. 2, 2019, 3 pages. Partial English Summary.
Taiwan Search Report, (Taiwan Application No. 105111647, dated Dec. 2, 2019, 2 pages. English Translation.

* cited by examiner

R1: { W>=0.01 & W<=0.04 | W>=0.10 }

AUTOMATION GENERATION OF TEST LAYOUTS FOR VERIFYING A DRC DECK

RELATED APPLICATIONS

This application is a 35 U.S.C. § 371 national phase application of PCT/IB2015/052734 (WO 2016/166571 A1) filed on Apr. 15, 2015, entitled "Automatic Generation of Test Layouts for Verifying a DRC Deck," which is incorporated herein by reference in its entirety.

TECHNICAL FIELD AND BACKGROUND

The present disclosure relates to computer-aided testing for design verification of integrated circuits, and more particular a method for automated generation of test layouts for verification of design rule checking decks.

Design Rule Checking (DRC) is an area of Electronic Design Automation (EDA) that is used to determine whether the layout design of an integrated circuit satisfies a series of recommended parameters called design rules. Due to the complexity and sheer number of circuit parts in a typical integrated circuit, the DRC process is typically performed using CAD software or more specifically DRC software. An example of DRC software is Calibre® by Mentor Graphics®. Typically, the design rules are specific to a particular manufacturing process and may specify for example certain geometric and connectivity restrictions to ensure sufficient margins to account for variability in the manufacturing processes. A set of design rules for a particular process is referred to as a DRC deck, DRC run-set, or rule deck. A typical DRC deck may include instructions for the running of several hundred to thousands of design rule checks. For example, a DRC deck may comprise a command language input file that instructs a processor how to execute the design rule checks on a layout design file defining polygon shapes representing an integrated circuit to be manufactured.

In order to verify an implementation of a DRC deck, a collection of test layouts is needed consisting of cases one expects to pass the design rule check—the so-called 'pass cases', and cases one expects to fail the design rule check— the so-called 'fail cases'. For instance, if it is desired to test whether a certain requirement (constraint) of a design rule is implemented correctly, it is useful to generate at least one fail case and at least one pass case for that requirement. However, because the number of valid topologies of the edges and shapes featuring in a design rule deck grows very rapidly with their number, as does the number of combinations of parameter values, it will be appreciated that the amount of test layouts or patterns can get exceedingly large. Manual generation of test layouts is limited by the imagination, expertise, and diligence of the person tasked with creating the layouts. Accordingly, it is desired to generate the test layouts automatically using a computer.

For example, U.S. Pat. No. 8,875,064, describes automated design rule checking (DRC) test case generation, wherein the method includes extracting coordinates of an error marker in an integrated circuit design, creating an error polygon using the coordinates, selecting polygons in the design that touch the error polygon, identifying a rectangle that encloses the selected polygons, and generating a test case based on data of the design contained within the rectangle. Unfortunately, the known method relies on error markers in an integrated circuit design which may not be adapted to cover the rules of a specific DRC deck.

Accordingly, it is desired to improve automatic generation of test layouts for verifying a DRC deck, in particular to provide test layouts that are of particular relevance for checking the DRC deck.

SUMMARY

One aspect of the present disclosure provides a computer-implemented method for automated generation of test layouts for verifying a DRC deck. For example, the DRC deck comprises design rule checks for verification of compliance of a circuit design with a selected manufacturing process. The method comprises receiving a first layout comprising one or more polygon shapes defined by a plurality of polygon parameters. For example, the one or more polygon shapes represent circuit parts in one or more layers of a circuit design. The method comprises receiving design rules, comprising one or more constraints on the polygon parameters. For example, the constraints define parameter boundaries for the polygon parameters between feasible and infeasible regions for the parameters depending on whether the constraints are satisfied. The method comprises calculating a second layout by applying a random change of value to at least one of the polygon parameters of the first layout. The method comprises calculating a third layout by varying values of the polygon parameters of the second layout until a respective slack or margin of the polygon parameters with respect to one or more of the parameter boundaries is minimized. The method comprises storing the third layout as a candidate test layout for the verifying of the DRC deck. For example, candidate test layouts can be stored as a pass case or fail case, depending on whether it satisfies the design rules It is presently recognized that when test layouts are created in an exhaustive way, the number of such layouts can increase exponentially to the point that it is unworkable. On the other hand, when test layouts are created in a controlled way such as to limit their number, for instance by putting a range on some space or width, it is likely to miss important pass and fail cases, resulting in bad coverage for the tested design rules. Using the present methods it is in principle possible to exhaustively generate layouts in a randomized way but wherein the random layouts are subsequently optimized to those that are most interesting for testing the design rules. Effectively, the set of all possible layouts and topologies can be repeatedly sampled in a random way and, after optimizing, only layouts that are interesting, because they pass or fail the design rule check by a minimal margin (slack), are added to the collection of test layouts. One advantage of this method over methods relying on random generation alone, is that good coverage can already be obtained with a relatively small number of test layouts. One advantage of this method over methods relying on optimizing alone, is that the random sampling may increase coverage also for layouts that were not envisaged beforehand. Moreover, the coverage increases with the runtime of the program, and approaches a hundred percent given enough time. Of course, larger coverage implies a larger number of test layouts, but that number will not 'explode', as with methods based on random generation alone.

The present methods may produce solutions or layouts which are biased to be more useful for testing the design rules. For example, interesting cases may be those having a space that deviates by no more than 1 unit (minimum grid distance) from the required value according to the constraint. It will be appreciated that cases with larger deviations from the required value, give little or no additional coverage and thus can be safely ignored. According to one aspect of the present disclosure, the number of generated test layouts is minimized by biasing the selection of test layouts towards those that are near a boundary of a constraint which is considered interesting to test. For such boundary cases small changes of edge positions—typically 1 unit—may cause the tested aspect to become essentially different. For instance, if the aspect is a minimal distance requirement, two moves of an edge by 1 unit can alter the state of the requirement from fulfillment with minimal slack, to exact compliance, to not satisfying the requirement with minimal slack In randomizing the polygon parameters, it is found that particularly interesting cases can be effectively reached by including both topology randomization as well as distance randomization. In a topology randomization, the number or sequence of edges of the polygon shapes can be altered which means that possibly different design rules may apply. For example, a distance check can be different depending on whether two shapes are arranged side by side or one above the other. In a distance randomization, edges of the polygon shapes may change distance with respect to the boundaries of the constraints which can lead to finding different border cases within a topology. A distance change may also result in crossing between a pass and fail case, which are both interesting for testing the design rules. In addition, the selection between a topology change or distance change can itself be randomized to effectively sample the number of interesting layouts, i.e. border cases of pass/fail for different constraints. To quickly discover candidate test layouts in different topologies, it is preferable to bias the random selection towards the selection of topology randomization.

While minimizing the slack, it is found preferable to focus on distance minimization within a certain topology. In this way it can be prevented that different design rules come into play while minimizing. For example, the polygon parameters can be prevented from crossing a boundary of the constraints for topology preservation. Minimizing a slack of the parameters can e.g. be performed by converting an inequality constraints into an equality through addition of a so-called slack variable known as such in the field optimization problems. For example, the constraint can be formulated as a slack variable that is a function of the parameter values. For example, if the slack variable is positive, this means that the constraint is satisfied (feasible region). Typically, if the slack variable is negative, this means that the constraint is not satisfied (infeasible). However, in the present methods such infeasible regions can also be interesting test layouts for a fail case. By minimizing an absolute value of the slack variable, the parameters can be modified to find a test layout that is on either side of the crossing between a pass or fail. Typically, a layout can be optimized towards an interesting (borderline) test through minimization of multiple slack variables. To quickly converge on a suitable test layout, it is found preferable to give priority to minimizing the lowest initial slack first. Other slack variables can be handled also in sequence from low to high, e.g. determined after a previous slack variable is minimized. As an additional constraint, in minimizing a next slack variable, it can be advantageous to fix any previous slack variables at their minimum.

The procedure can be iterated to generate multiple test layouts to test any number of aspects of the design rules. By keeping track of the ratio between newly found layouts and layouts that are the same as previously found, an informed decision can be made whether to halt the iterations if the coverage is deemed sufficient. For example, if less then ten percent of generated layouts is uniquely different from previously generated layouts, it can be decided that already a substantial percentage of useful layouts has been discovered. The candidate layouts can also be filtered to keep only unique relevant cases, e.g. testing the passing and failing of any combination of design rules only once. For example, a pair of layouts with a pass case and a fail case wherein the layouts differ only minimally from each other can be interesting to test exactly the borderline case of a design rule. For example a pass layout may differ from a fail layout by a different edge position shifter by one grid (minimum) distance.

For each iteration a new seed layout can be received, or the same seed can be used. The new seed layout can also be based on the previously found layouts. This can have the advantage that the previously found layout is already a borderline case so by changing one parameter value, there is an increased chance that the new layout is also near at least some of the borders of one or more constraints. By using the last found layout as seed for the next iteration, the layouts can be found by a random path through parameter space that can travel further e.g. in terms of differing topology from the initial seed layout. Of course also combinations are possible. It is also possible to bias the selection of a seed layout from previously found layouts depending on the success rate of finding new unique layouts. For example if a certain seed layout is exhausted in terms of finding further unique test layouts, that seed layout can be biased to occur less often.

A second aspect of the present disclosure provides a computer system for automated generation of test layouts for verifying a DRC deck, the computer system comprising a memory and one or more processors coupled to the memory wherein the memory contains a set of instructions which, when executed by the one or more processors, cause the one or more processors to perform operations comprising one or more of the methods as described herein.

A third aspect of the present disclosure provides a non-transitory computer storage medium encoded with a computer program, the computer program comprising a set of instructions which, when executed by one or more computers cause the one or more computers to perform operations comprising one or more of the methods as described herein It will be appreciated that the present methods and system may find application in a design and production process leading ultimately to the manufacture of integrated circuits. In one application, the present disclosure provides a method for verifying a DRC deck comprising the automated generation of test layouts as described herein and verifying the DRC deck using the test layouts. In a further application, the present disclosure provides a method for verifying a circuit design comprising the verifying of the DRC deck as described herein and verifying the circuit design with the verified DRC deck. In a further application, the present disclosure provides a method for manufacturing a circuit, the method comprising the verifying of the circuit design as described herein and manufacturing the verified circuit design. It will be appreciated that by verification of the DRC deck, the DRC deck can be more trustworthy to effectively verify the circuit design which can lead to increased yield for manufacturing the circuit.

BRIEF DESCRIPTION OF DRAWINGS

These and other features, aspects, and advantages of the apparatus, systems and methods of the present disclosure will become better understood from the following description, appended claims, and accompanying drawing wherein:

DESCRIPTION OF EMBODIMENTS

Figure 1A:
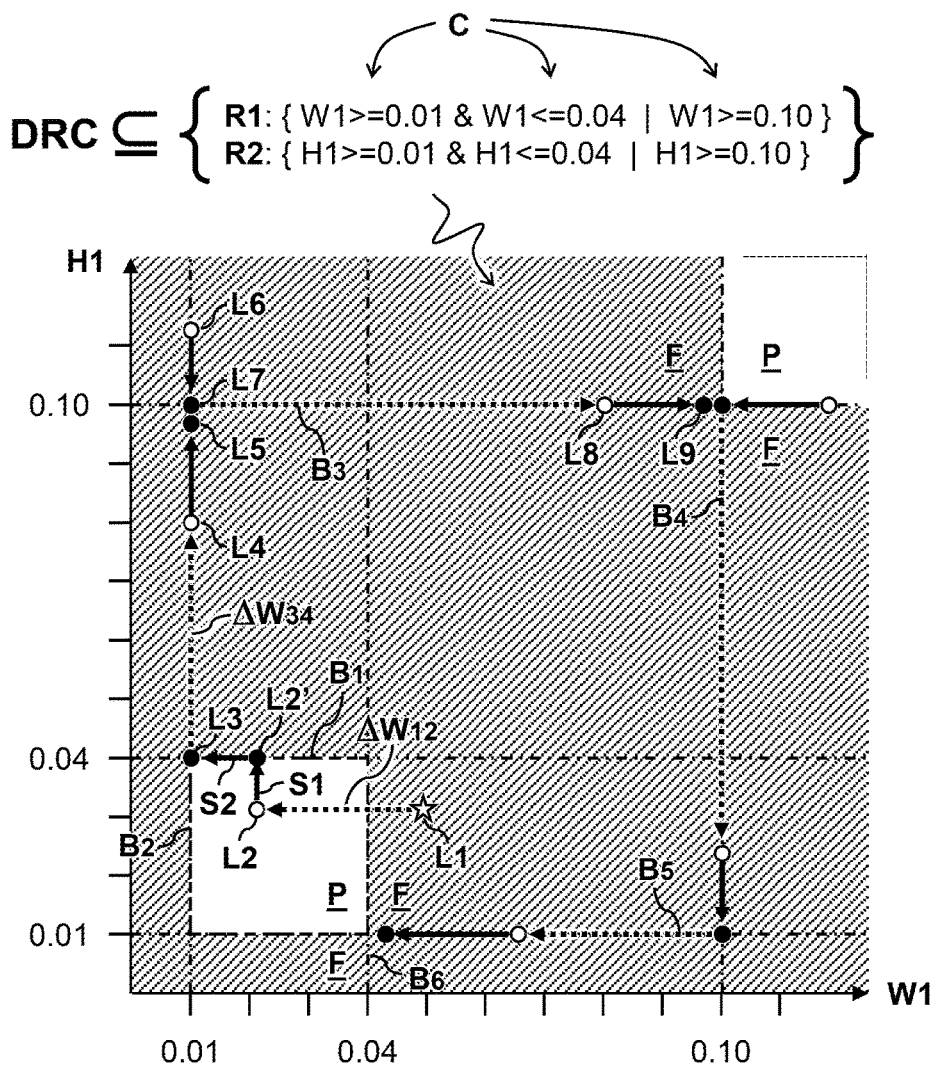
FIG. 1A schematically illustrates a path of generating test layouts in a parameter space.

Unless otherwise defined, all terms (including technical and scientific terms) used herein have the same meaning as commonly understood by one of ordinary skill in the art as read in the context of the description and drawings. In some instances, detailed descriptions of well-known devices and methods may be omitted so as not to obscure the description of the present systems and methods. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be understood that when a connection between structures or components is described, this connection may be established directly or through intermediate structures or components unless specified otherwise. In the drawings, the absolute and relative sizes of systems and components may be exaggerated for clarity. Embodiments may be described with reference to schematic and/or cross-section illustrations of possibly idealized embodiments and intermediate structures of the invention. In the description and drawings, like numbers refer to like elements throughout.

Figure 1B:
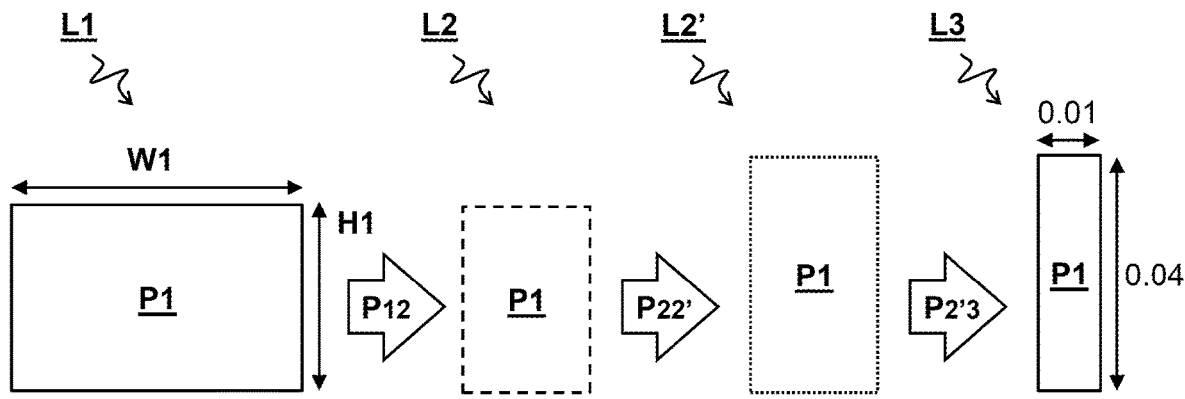
FIG. 1B schematically illustrates intermediate layouts during generation of a test layout.

FIG. 1A schematically illustrates a parameter space spanned by two parameters H1 and W1. The randomization and optimizing of layouts as described herein can be illustrated for example by a path through the parameter space of the polygon parameters. FIG. 1B schematically illustrates a polygon shape P1 according to different values of the polygon parameters H1 and W1 for different layouts L1 to L3.

According to the embodiment illustrated in FIG. 1A, the parameter space is divided into pass regions "P" (white background) and fail regions "F" (hatched pattern). A point in the parameter space falling in a pass region "P" satisfies the combination of constraints C of the design rules R1 and R2. A point in the parameter space falling in a fail region "F", does not satisfy one or more of the design rules R1 and R2. For example, the design rules R1,R2 may be equal to or a subset of a larger set of design rule checks or the DRC deck to be verified, i.e. for which a test layout is to be generated.

According to the embodiment illustrated in FIG. 1B, the parameters in this case refer to a height H1 and a width W1 of a polygon P1 in a layout. According to the design rule R1, the width of the polygon P1 should be between 0.01 and 0.04 or larger than 0.10. The design rule R2 is similar but then for the height H1 of the polygon P1. It will be noted that a design rule may comprise a logic or Boolean combination of multiple constraints "C". The symbol "&" refers to a Boolean "AND" operation while the symbol "|" refers to a Boolean "OR" operation between the requirements of different constraints. The design rules R1 and R2 can also be combined by a Boolean operator, e.g. requiring that R1 AND R2 are both satisfied.

According to one aspect, the present disclosure provides a computer-implemented method for automated generation of test layouts for verifying a DRC deck. In one embodiment, the method comprises receiving a first layout L1, also referred as seed layout. In one embodiment, the seed layout is described in GDS format, wherein the polygon shapes which are going to be varied are given. The exact positions of the edges of the shapes are not very important, as long as they have a valid starting topology. The initial seed layout may itself also be created automatically, e.g. using random initial parameters. Alternatively a previously stored layout can be used as seed, or the initial seed may be created manually. In one embodiment, the layout L1 comprises a polygon shape P1 defined by a plurality of polygon parameters W1,H1. For example, the polygon shape P1 represent a circuit part in one or more layers of a circuit design.

In one embodiment, the method comprises receiving design rules R1,R2 comprising constraints C on the polygon parameters W1,H1. Each of the design rules may comprise one or more constraints C on the polygon parameters W1,H1. Typically, at least some of the constraints are inequality constraints, e.g. expressed as equations that define an open-ended range of allowed values for one or more of the parameters separately, or in combination. Of course the design rules may also comprise other constraints, e.g. equality constraints that can e.g. be used to define or eliminate one of the variable polygon parameters.

The constraints C can be used to define respective parameter boundaries B1,B2 (indicated by dash-dotted lines in the present figure) in a parameter space for the polygon parameters W1,H1 between a feasible region wherein that constraint holds and an infeasible region wherein that constraint is not satisfied. For example, for an inequality constraint (e.g. A<B, A≤B, A>B, A≥B) there is typically a feasible region in parameter space wherein the inequality constraint holds separated by a parameter boundary from an infeasible region wherein the inequality constraint is not satisfied, The parameter boundary may be included in one of the feasible or infeasible regions depending on whether the inequality constraint comprises a larger/smaller than sign (">" or "<");

or an equal or larger/smaller than sign ("≥" or "≤"). As another example, for an equality constraint the feasible region and the parameter boundary may coincide on a line while an infeasible region is everywhere except on the parameter boundary.

In one embodiment the parameter boundaries B1,B2 are further defined as a subset wherein the polygon parameters W1,H1 cross between passing ("P") and failing ("F") one or more design rules R1,R2. It may be noted that the feasible regions of the individual constraints "C" are typically not the same as the pass/fail regions which follow from one or more design rules. For example, a region can be feasible for one of the constraints (e.g. W1≤0.04) while being infeasible for another constraint (e.g. W1≥0.10). By combining constraints using a logical "OR" operation, feasible regions of either constraints may be feasible for the combination laid down in a design rule. Conversely, by combining constraints using a logical "AND" operation, regions of the combination are only feasible if both constraints are satisfied.

Parameter boundaries B1,B2 can thus be defined for each of the constraints separately or a Boolean combination thereof according to one or more of the design rules. In one embodiment, the parameter boundaries include constraints that preserve the topology (e.g. the sequence or number of edges) in the layout. By defining the parameter boundaries B1,B2 for each of the different types of constraints, the optimizing can involve the minimizing of slack e.g. with respect to a manufacturability constraint and/or a topological constraint that may be both be defined as part of a design rule. The topology constraints can also be provided separate from the manufacturability constraints, e.g. wherein a set of manufacturability constraints is defined for a certain topology or wherein manufacturability constraints (e.g. distance checks) are automatically derived for different topologies. The design rules themselves may also be combined by Boolean operators. For example the design rules can be combined disjunctively or conjunctively. It is presently found that interesting test layouts may arise particularly at the boundary of a distance to be checked and at a topology change.

In one embodiment, the method comprises calculating a second layout L2 by applying a random change $\Delta W12$ of value to at least one of the polygon parameters W1 of the first layout L1. By randomly changing at most one of the polygon parameters at a time, it may be easier to find again an optimized layout after randomization because the other parameters may in some cases still be optimal i.e. near their respective parameter boundary. By randomly changing more than one parameter at a time, different topologies may be faster achieved. Of course also combinations are possible.

In one embodiment, the random change $\Delta W12$ of value of at least one of the polygon parameters W1 comprises modifying the polygon parameter W1 based on a random generated number. In another or further embodiment, the random change $\Delta W12$ comprises adding, subtracting, multiplying, or dividing the value of the polygon parameter W1 by a random number chosen in a pre-selected range. In another or further embodiment, the pre-selected range is based on a scale of the second layout L2. In one embodiment, the pre-selected range is based on a proximity of the second layout L2 to a parameter boundary B1,B2.

In one embodiment, the polygon parameters W1,H1 are allowed to cross one or more parameter boundaries B1,B2 between a feasible region and an infeasible region, or vice versa, as a result of the random change $\Delta W12$. In other words, the second layout L2 may have a different topology than the first layout L1, e.g. with a different sequence and/or number of edges for the polygon shapes.

In one embodiment, the random change of the first layout may comprise a topology randomization ($\Delta T1$) and/or a distance randomization. In a topology randomization, a random change of a polygon parameter alters the sequence or number of edges of the polygon shapes P1,P2 in the second layout L2 compared to the first layout L1. In a distance randomization, a random change of a polygon parameter alters a distance between edges of shapes in the second layout compared to the first layout. In one embodiment, in calculating the second layout L2, a random selection is made from at least a topology randomization and a distance randomization.

In one embodiment, the method comprises calculating a third layout L3 by varying values of the polygon parameters W1,H1 of the second layout L2 until a respective slack S1,S2 of the polygon parameters W1,H1 with respect to one or more of the parameter boundaries B1,B2 is minimized. In other words, the margin of the polygon parameters with respect to the constraint is minimized. In one embodiment, the slack is minimized to be at most on grid spacing (resolution of the DRC program) from the parameter boundary.

In one embodiment, a slack S1,S2 of a constraint is calculated by filling the values of the polygon parameters W1,H1 into the respective inequality constraint and setting the slack S1,S2 equal to a difference in value between a left hand side and right hand side of the constraint equation. Because the parameters may be in either a feasible or infeasible region of the constraint, it can be advantageous to minimize an absolute value of the slack. This takes into account that the parameter may also be at the 'wrong' side of the parameter boundary which is still an interesting test layout.

In one embodiment, before minimization, respective initial slacks S1,S2 of a plurality of constraints are calculated; and the minimizing is biased to vary the polygon parameters H1 in the constraint with the lowest initial slack S1 to minimize the lowest initial slack S1 first. In one embodiment, the slacks S1,S2 are minimized in sequence starting with the lowest initial slack S1; recalculating the slacks; and continuing with the next lowest slack S2 after the first minimizing.

In one embodiment, the polygon parameters W1,H1 are prevented from crossing all or some of the parameter boundaries B1,B2 while minimizing the slack S1,S2 between the second layout L2 and the third layout L3. In this way, the topology of the layout may be preserved while still optimizing towards the parameter boundary. In another or further embodiment, in calculating the third layout L3 by minimizing the slack, the polygon parameters W1,H1 are prevented from crossing a boundary of the constraints of one or more (e.g. all) of the design rules R1,R2. In this way the layout does not change character from a pass case "P" to a fail case "F", or vice versa. For example, the minimizing of the slack variables S1,S2 may be subject to modified constraints that prevent crossing the parameter boundaries B1,B2. In one embodiment, one or more constraints of the design rules R1,R2 may modified by inverting the feasible and infeasible regions. In one embodiment, the modified constraints are derived by inverting one or more of the constraints C of the design rules R1,R2 until the polygon parameters W1,H1 of the second layout L2 satisfy the modified inequality constraints.

In one embodiment, the method comprises storing the third layout L3 as a candidate test layout for the verifying of the DRC deck. For example, the third layout can be stored in memory or on disc, or any other conceivable local or remote storage medium. In another or further embodiment, the third layout L3 is stored as a pass case "P" if the values for the polygon parameters W1,H1 of the third layout L3 satisfy all the received design rules R1,R2, or as a fail case "F" otherwise. Of course the categorization into pass and fail cases can also be performed afterwards.

In one embodiment, the method is iterated e.g. by taking the candidate test layouts L3 as a new seed layout received in the next iteration. Accordingly in a second iteration, may comprise randomly changing the same or another one or more polygon parameters. For example, as illustrated in FIG. 1A, the layout L4 is calculated from layout L3 by a random change $\Delta W34$ of a parameter value of H1. The randomized layout L4 is subsequently optimized to layout L5 by minimizing the slack to with respect to the parameter boundary B3. And this process may be iterated to produce the layouts L6 through L9 and further.

The polygon shapes described herein may represent respective circuit parts. The layout data including the circuit parts may represent a layout of an integrated circuit. The integrated circuit may be comprised in a multi-layer stack of different circuit layers. The layout data may comprise circuit parts in data layers matching the physical structures in layers of the integrated circuit. Alternatively or in addition, the layout data may comprise circuit parts in derived data layers e.g. resulting from Boolean combinations and/or other derivations such as OPC of the physical layers and structures. A circuit part may be represented in the layout data e.g. by a polygon shape, i.e. a shape comprised of connected line segments forming a surface within their circumference. According to one definition, a circle may also be considered a polygon shape. However, from a computational point of view of e.g. the design rule checking process, it may be preferred that the circuit parts be represented by polygon shapes comprising straight line segments, e.g. rectangles, triangles, or combinations thereof. The layout data may define circuit parts by the edges and/or filling of shapes representing a transferred layout of the circuit having a designated electrical and/or optical function. The layout may be transferred e.g. using a mask and/or deposition. The deposition material may comprise e.g. metal, semi-conductors, or insulators. Different circuit parts may comprise different materials.

Figure 2A:
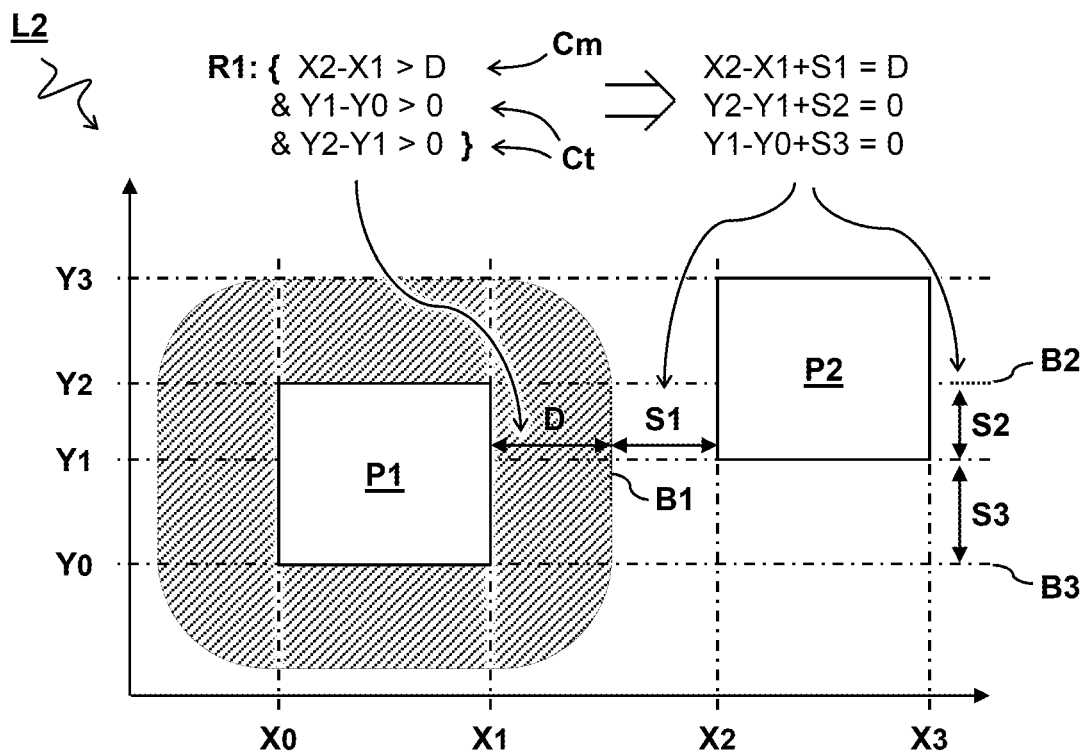
FIG. 2A schematically illustrates two polygon shapes in a first randomly generated layout passing the design rules.

FIG. 2A schematically illustrates two polygon shapes P1 and P2 in a first embodiment of a layout L2. The polygon shapes P1 and P2 are defined e.g. by the coordinates Xn and Yn (n=1,2,3,4) of their respective edges. Also shown in the figure is a hatched area around the first polygon shape P1 that should not be occupied by the second polygon shape P2 for reasons of manufacturability.

In one embodiment, the constraints comprise manufacturability (DRC) constraints Cm defining a minimum distances D between edges X1,X2 of the one or more polygon shapes P1,P2 for verifying compliance of the integrated circuit design with a selected manufacturing process. In one embodiment, the constraints comprise topology constraints Ct defining a sequence and/or number of edges Y0,Y1,Y2 of the one or more polygon shapes P1,P2 for preserving a relative layout of the one or more polygon shapes P1,P2. In the present embodiment, the design rule R1 comprises a Boolean combination of a manufacturability constraint Cm that applies within the range set by the topology constraints Ct. In another or further embodiment, (not part of the present design rule R1), the constraints comprise shape constraints, e.g. $X1-X0>0$, $Y1-Y0>0$, for defining minimum dimensions of the one or more polygon shapes P1,P2 for preserving presence or character of the one or more polygon shapes P1,P2. The shape constraints may also be equality constraints to set a fixed dimension of a polygon shape. Accordingly, it will be understood that the design rules, as used herein, may include e.g. a combination of manufacturability constraints, topology constraints, and/or shape constraints. Also other constraints may be included.

Figure 2B:
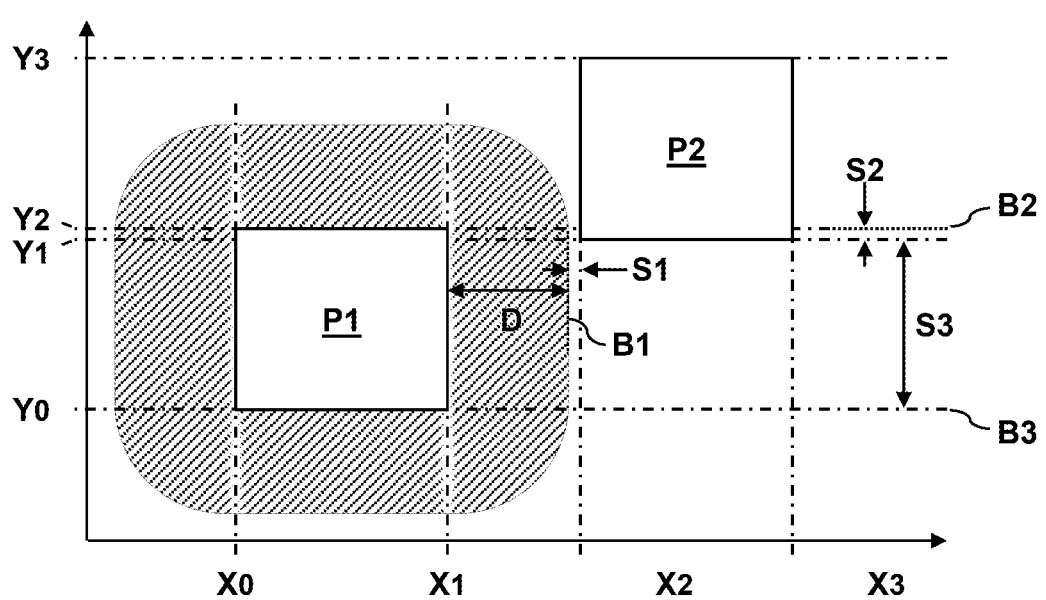
FIG. 2B schematically illustrates a first test layout derived from the random layout of FIG. 2A after optimization.

FIG. 2B schematically illustrates a first test layout L3 derived from the layout of FIG. 2A after optimization.

In one embodiment, the calculating of the third layout L3 comprises calculating one or more slack variables S1,S2,S3 of the constraints of the design rule R1 as a function of the polygon parameters Xn,Yn. For example, a slack variable can be defined as a variable that is added to an inequality constraint to transform it to an equality. For an equality constraint, a slack variable can be defined a variable that is added to one side of the equation to satisfy the constraint. Accordingly, if an equality constraint is already satisfied, the slack can be defined zero; if an equality constraint is not satisfied, i.e. the parameters are in an infeasible region, the slack can be considered a measure of how far the equality constraint is from being satisfied.

In the present case, each of the inequality constraints forming the design rule R1 are transformed into equality equations by adding a respective variable Sn to the left hand side of the equations. The equations may be rearranged to express the slack variable as a function of the parameters, e.g. $S1=D-(X2-X1)$. The slack variable can be positive or negative depending on whether the parameters satisfy the constraint. Alternatively, the slack variable can be always positive if the inequality constraint is inverted when it is not satisfied.

In a further embodiment, the calculating of the third layout L3 comprises varying the values of the polygon parameters Xn,Yn of the second layout L2 towards minimizing an absolute value of the one or more slack variables S1,S2. It may be noted that in the present embodiment, the slack variable S1 can not be exactly zero because this would mean crossing the boundary between a pass case and a fail case according to the manufacturability constraint Cm: $X2-X1>D$. The minimum value of S1 within the constraints of the topology of L2 may e.g. be a minimum grid distance according to a resolution of the design tool. It is noted that the slack S2 and S3 in this case are reciprocal. In one embodiment, the minimization of slack S3 is constrained by keeping the previously minimized slacks S1 and S2 fixed. In this case it means that slack S3 is already minimal insofar as allowed by the constraint of the minimal slack S2. The minimization order can be based on the absolute value of the slack in the non-optimized layout L2.

Figure 3A:
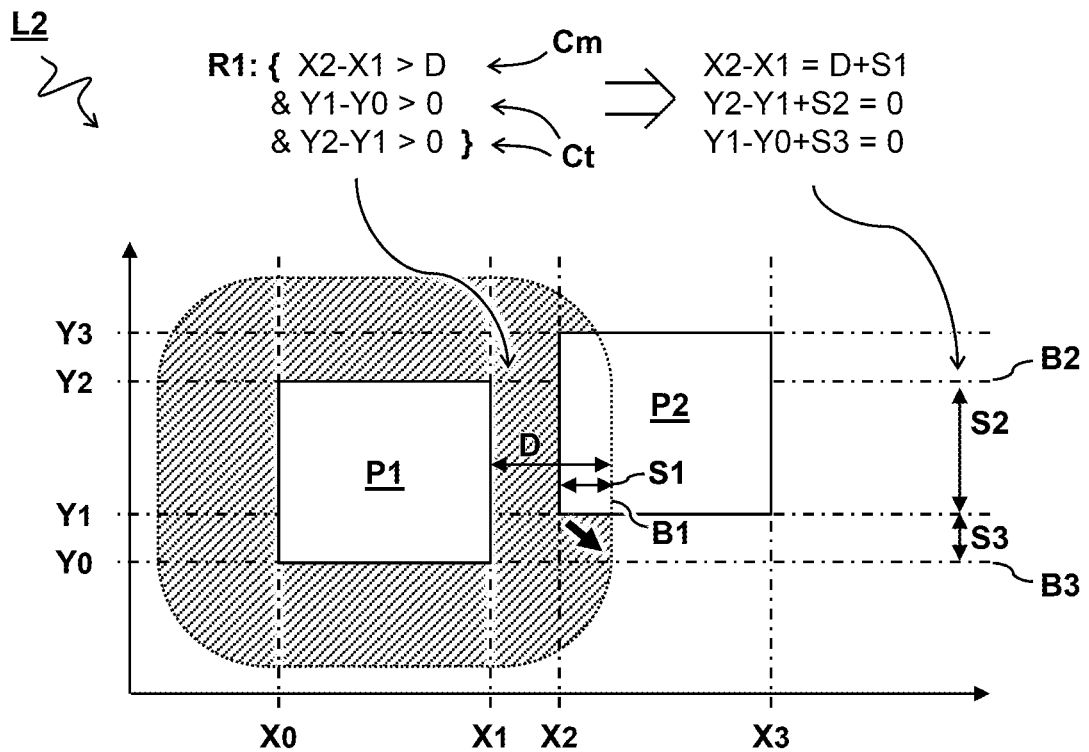
FIG. 3A schematically illustrates two polygon shapes in a second randomly generated layout for failing the design rules.

FIG. 3A schematically illustrates two polygon shapes P1 and P2 in a second embodiment of a layout L2. The embodiment is similar to that of FIG. 2A, except that in this case the polygon shape P2 is within the minimum allowed distance D from the polygon shape P1 according to the design rule R1. Accordingly, the manufacturability constraint Cm of the design rules R1 is not satisfied and the layout constitutes a fail case. Another difference with FIG. 2A is that the polygon shape P2 is now initially closer to the boundary B3 than to boundary B2 of the topology constraints Ct.

Figure 3B:
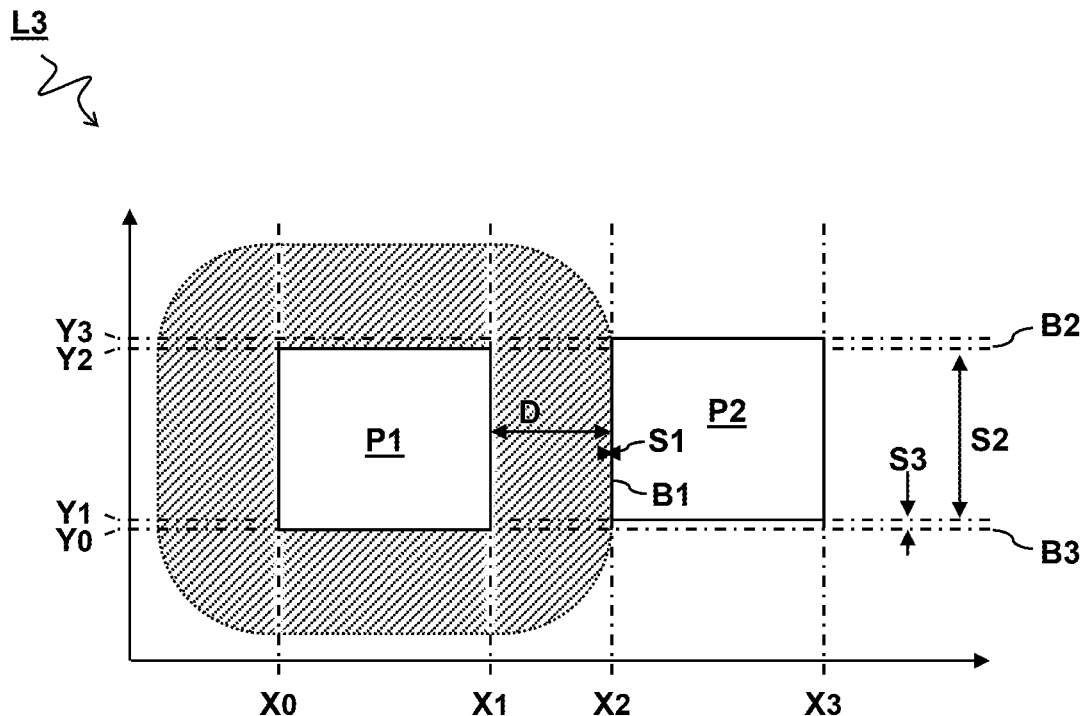
FIG. 3B schematically illustrates a second test layout derived from the random layout of FIG. 3A after optimization.

FIG. 3B schematically illustrates a second test layout L3 derived from the layout of FIG. 3A after optimization. Similar as described with reference to FIG. 2B, slack variables S1,S2,S3 can be derived from the constraints of the design rule R1. However, in this case because the first constraint Cm is not satisfied, the slack variable S1 is added to the right hand side of the equation. Alternatively, the slack variable may be added to the left hand side if it is accepted that the slack variable has a negative value. In that case for example the absolute value of the slack variable S1 can be minimized. After minimization of the slack variables, it is noted that the polygon P2 resides exactly at the boundary B1 wherein it is still a fail test case according to the design rule R1. In this case, the polygon P2 has gravitated towards the boundary B3, e.g. because this was initially closer than the boundary B2 (initial lowest slack).

Figure 4A:
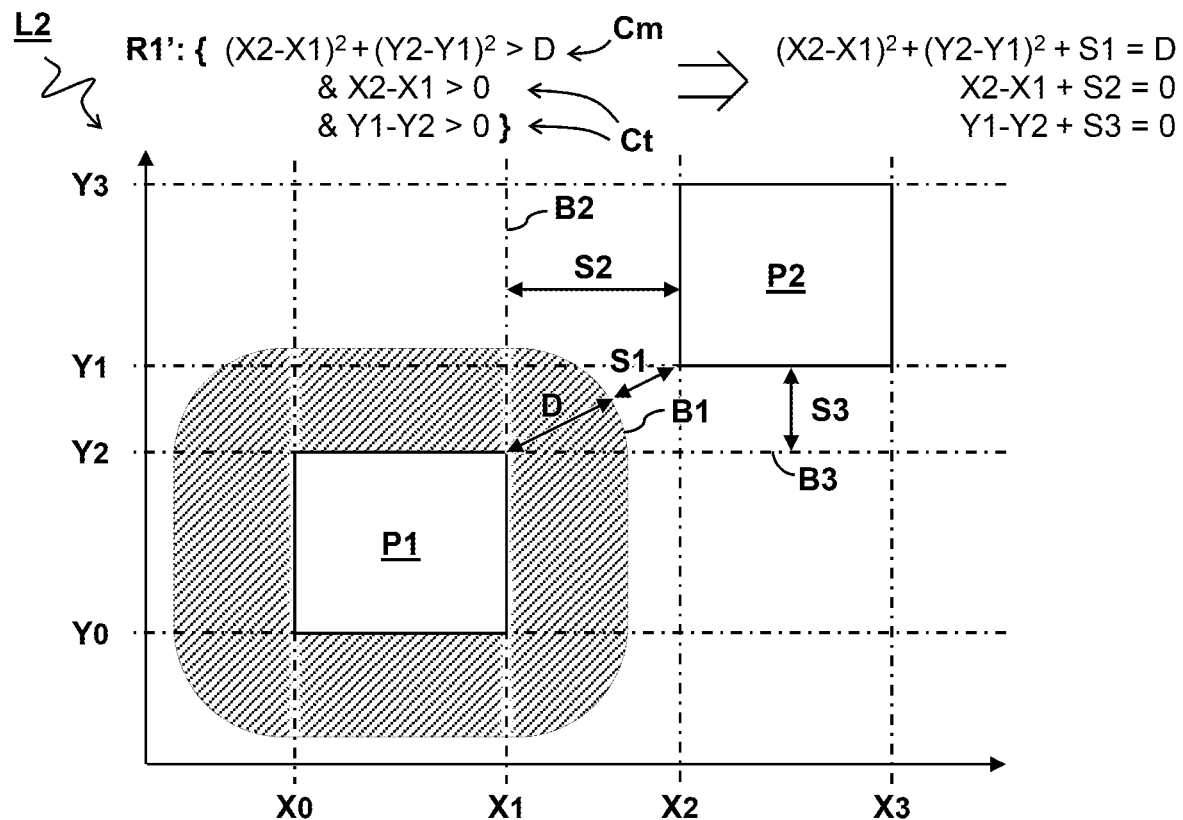
FIG. 4A schematically illustrates two polygon shapes in a third randomly generated layout passing the design rules but having different topology than FIG. 2A.

FIG. 4A schematically illustrates two polygon shapes P1 and P2 in a third embodiment of a layout L2. It will be noted that because the second polygon shape P2 is no longer next to the first polygon shape P1, a different design rule R1' (or a sub rule of the same design criterion) may come into play. In this case the design rule R1' is somewhat more complicated due to the curved boundary B1 indicating the minimum distance D between the polygon shapes. It is demonstrated by this example that the constraints may comprise non-linear terms of one or more multiple polygon parameters. In one embodiment, the minimizing of the slack is performed by a linear or nonlinear optimizer.

In one embodiment, the slack related to manufacturability constraint Cm (e.g. distance checks in the rule at test) is minimized before slack related to topology constraints Ct. Furthermore, if two slack expressions have equal value in the random start layout, it is preferred to give the expression with the smallest absolute value of slack priority.

Figure 4B:
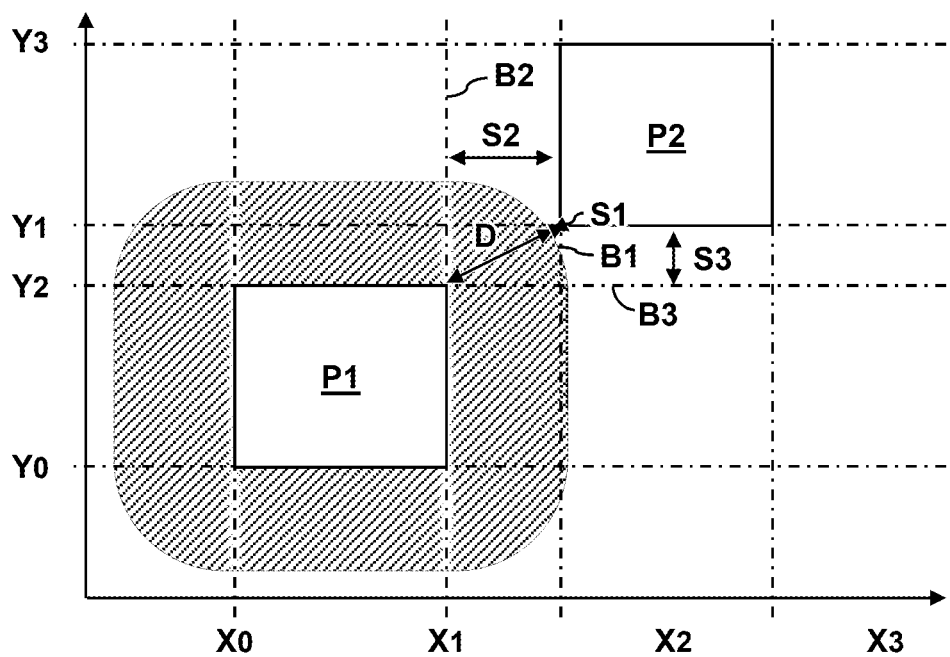
FIG. 4B schematically illustrates a third test layout derived from the random layout of FIG. 4A after optimization.

FIG. 4B schematically illustrates a third test layout L3 derived from the layout of FIG. 4A after optimization. In this case the slack variable S1 is minimized until the second polygon shape P2 is just outside the boundary B1, e.g. by a minimum grid distance. At this boundary, the slack variables S2 and S3 can no further be minimized without either increasing again the slack variable S1 or crossing the boundary B1, which is not allowed in this case.

Figure 5A:
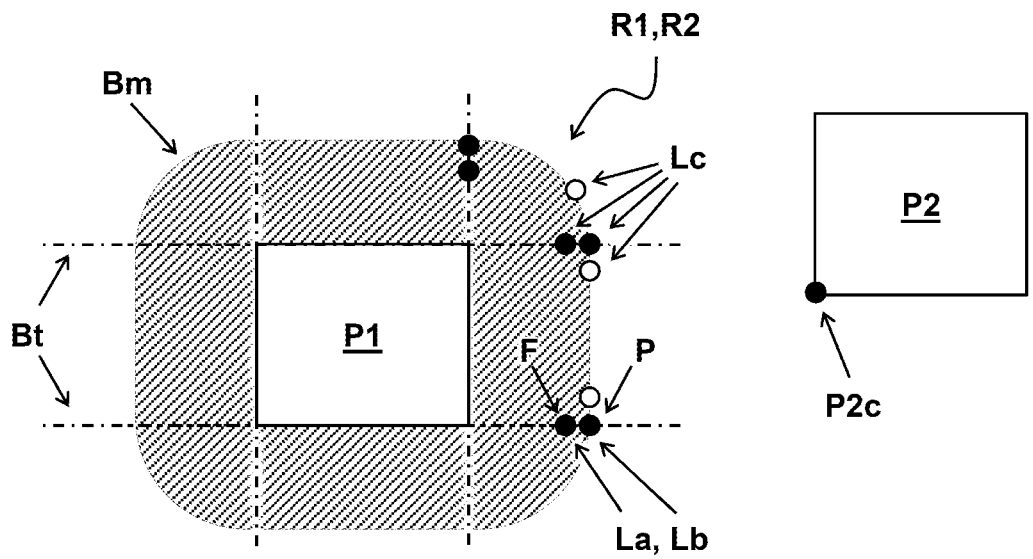
FIG. 5A schematically illustrates candidate test layout by depicting a first polygon shape and different positions of a corner points of a second polygon shape.
Figure 5B:
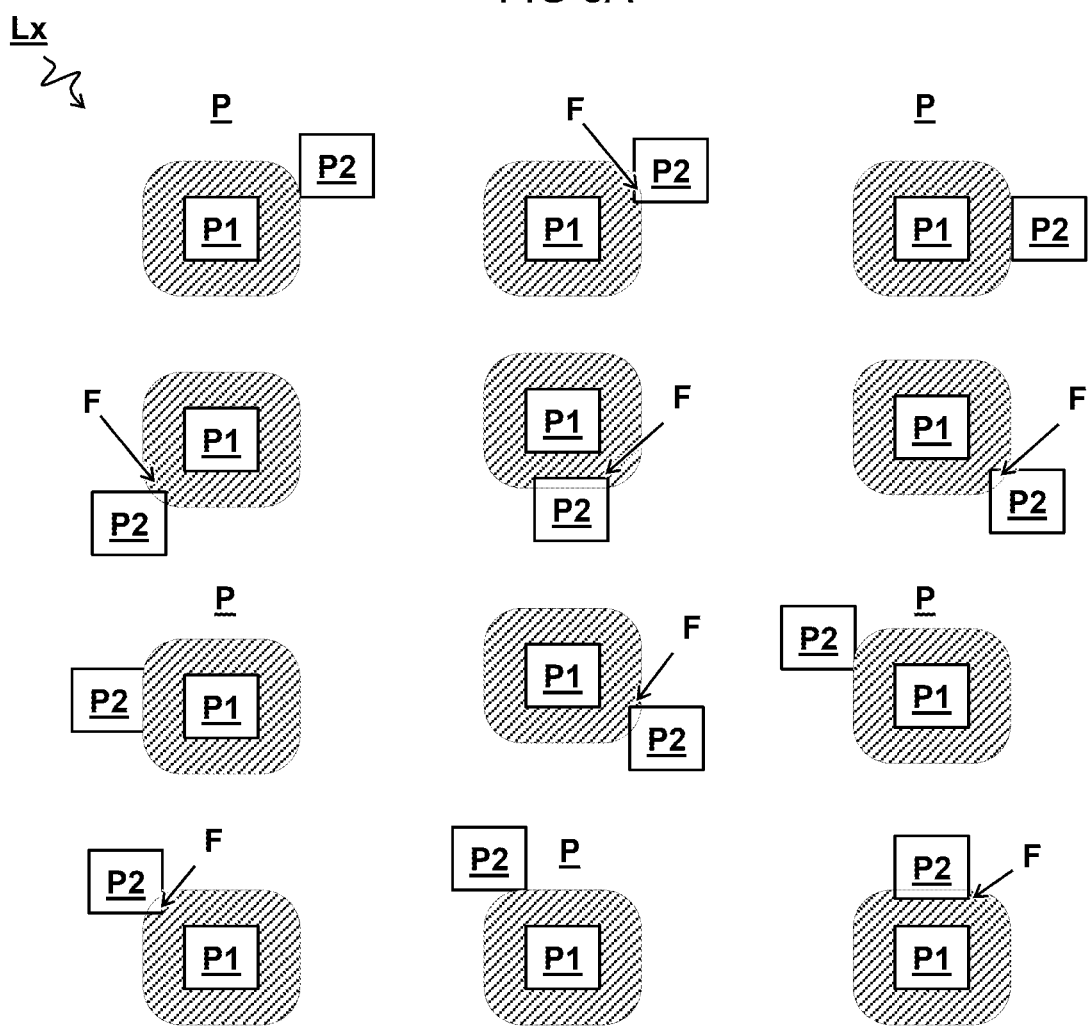
FIG. 5B schematically illustrates candidate test layouts.

FIG. 5A schematically illustrates candidate test layouts Lc by depicting a first polygon shape P1 and different positions of a corner point P2c of a second polygon shape P2. The candidate test layouts Lc are e.g. generated by repeated iterations of the methods described herein. FIG. 5B schematically illustrates further candidate test layouts that comprise pass and fail cases by a minimum margin.

In one embodiment, the stored candidate test layouts Lc are filtered to generate a final set of test layouts Lx, wherein the filtering comprises accepting a test layout only if it is part of a pair of candidate test layouts La,Lb, wherein an edge of any polygon shape is displaced by at most one minimum grid distance between the pair of candidate test layouts La,Lb, and wherein the pair holds both a pass P and fail F case of the design rules R1,R2. For example, in FIG. 5A, the candidate test layouts indicated by a white circle may be filtered out while the candidate test layouts indicated by a black circle may be retained.

Figure 6A:
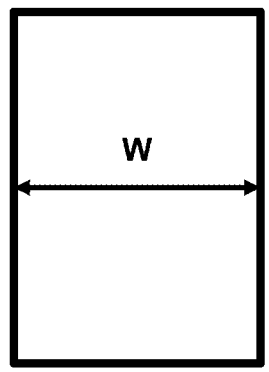
FIG. 6A schematically illustrates an example design rule.

FIG. 6A schematically illustrates an example design rule R1 that is similar as discussed with reference to FIGS. 1A and 1B. While the design rule only indicates the width W, this may also be applicable to the height if the shape is allowed to rotate by 90 degrees.

Figure 6B:
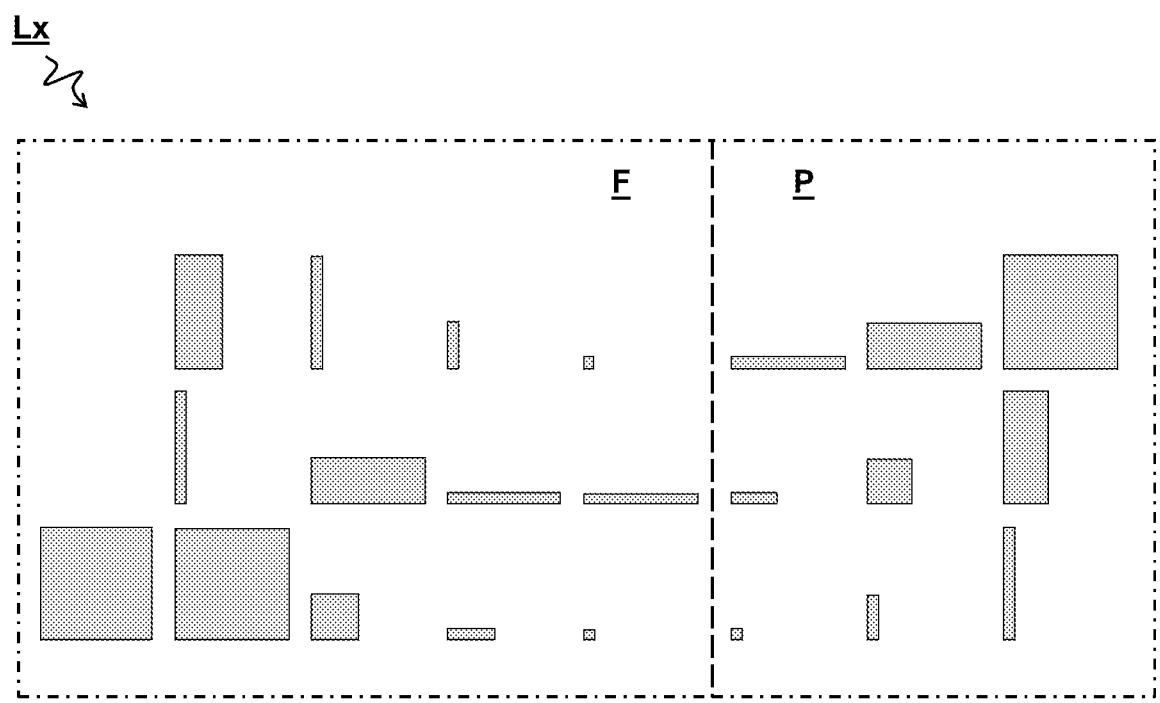
FIG. 6B schematically illustrates test layouts for verifying implementation of the design rule of FIG. 6A.

FIG. 6B schematically illustrates test layouts Lx for verifying implementation of the design rule of FIG. 6A. The test layouts Lx have been automatically ordered into fail cases on the left hand side and pass cases on the right hand side. For example, the integral layout with multiple shapes can be used to check a DRC deck wherein the indication of the pass fail positions according to the deck should conform with the test layouts.

Figure 7A:
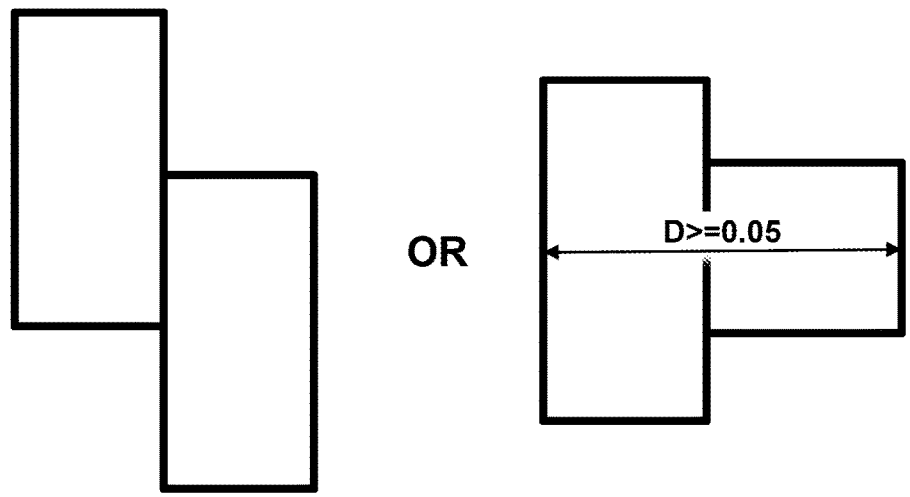
FIG. 7A schematically illustrates another example of a design rule.

FIG. 7A schematically illustrates another example of a design rule, which is somewhat more complicated. In this embodiment, the design rule checks the shape of the "OR" derived layer of two input layers. Layouts are considered to pass the design rule if the polygon of the OR derived layer has a T-shape with a length of the leg greater or equal to 0.05, or if it has a Z-shape ("zig-zag"). All other layouts are considered fail cases.

In one embodiment, the layouts define polygon shapes in multiple layers, and one or more of the design rules are defined by constraints on a derived layer that is a logic combination e.g., AND, OR, NOT of two or more of the multiple layers.

Many design-rules use "derived layers" in their definition. Derived layers define shapes in the layout, in other layers than the original ones, based on Boolean and sizing operations. For instance a derived layer can be the "AND" of two original layers, which means that a shape in this layer is only present where two shapes in the two original layers overlap. Similar, we can have shapes in derived layers be defined by growing or shrinking shapes in original layers. Any combination of these operations is possible. Now it is clear that shapes in derived layers can be subject to topology changes just as the original shapes. They can even disappear, or merge completely if sizing is involved. For instance when shapes are shrunk, starting with a too small original shape, will not generate a resulting shape in a derived layer. The approach in the present disclosure enables a good way of handling derived layers. After random layout change of the seed layout, the derived layers can be generated in a proper way. Then for the edges in the derived layers, topology preservation constraints can be made in the same way as has been done for the original shapes. Also the subsequent optimization to interesting layout takes the same approach. This causes resulting patterns, where also the topology variation on derived layers is tested, including tests that do have, or just don't have, shapes in the derived layers. Topology preserving equations related to derived layers can be optimized in the same way as regular topology equations, so also border cases for derived layers will be present.

Figure 7B:
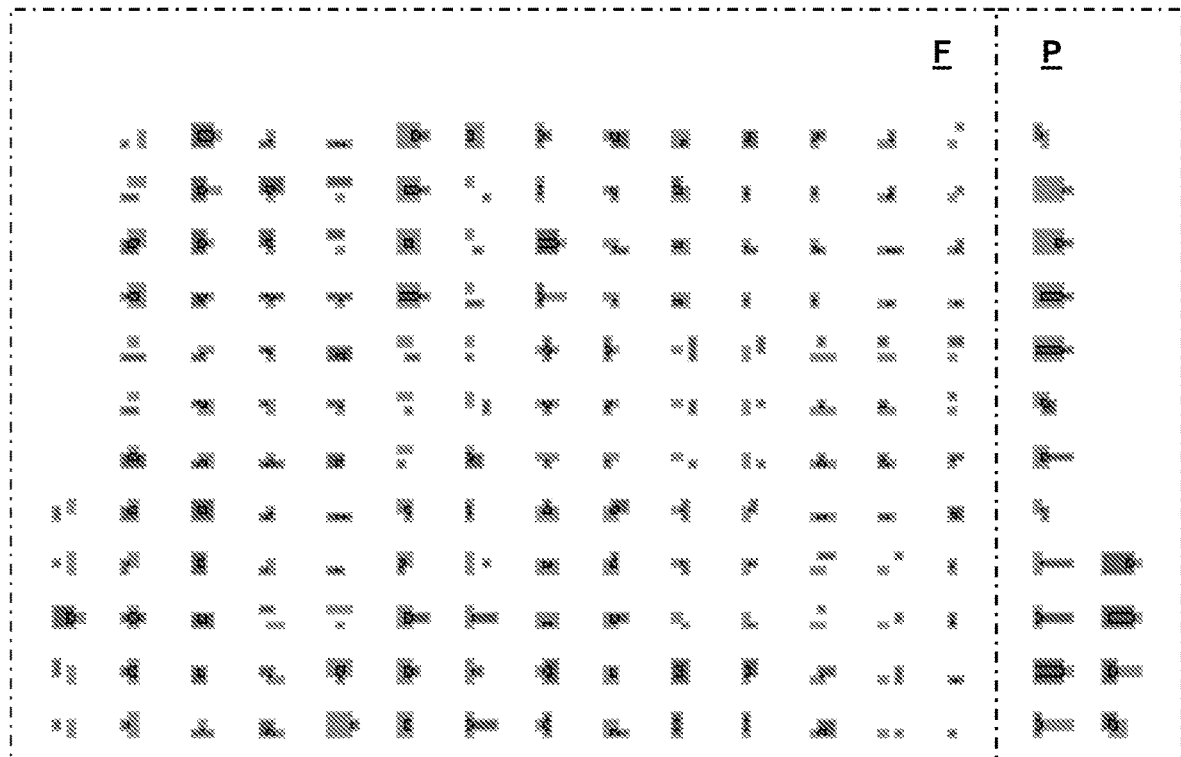
FIG. 7B schematically illustrates test layouts for verifying implementation of the design rule of FIG. 7A.

FIG. 7B schematically illustrates test layouts for verifying implementation of the design rule of FIG. 7A. It will be noted that the number of test layouts is already quite extensive and virtually infeasible to derive manually.

Figure 8:
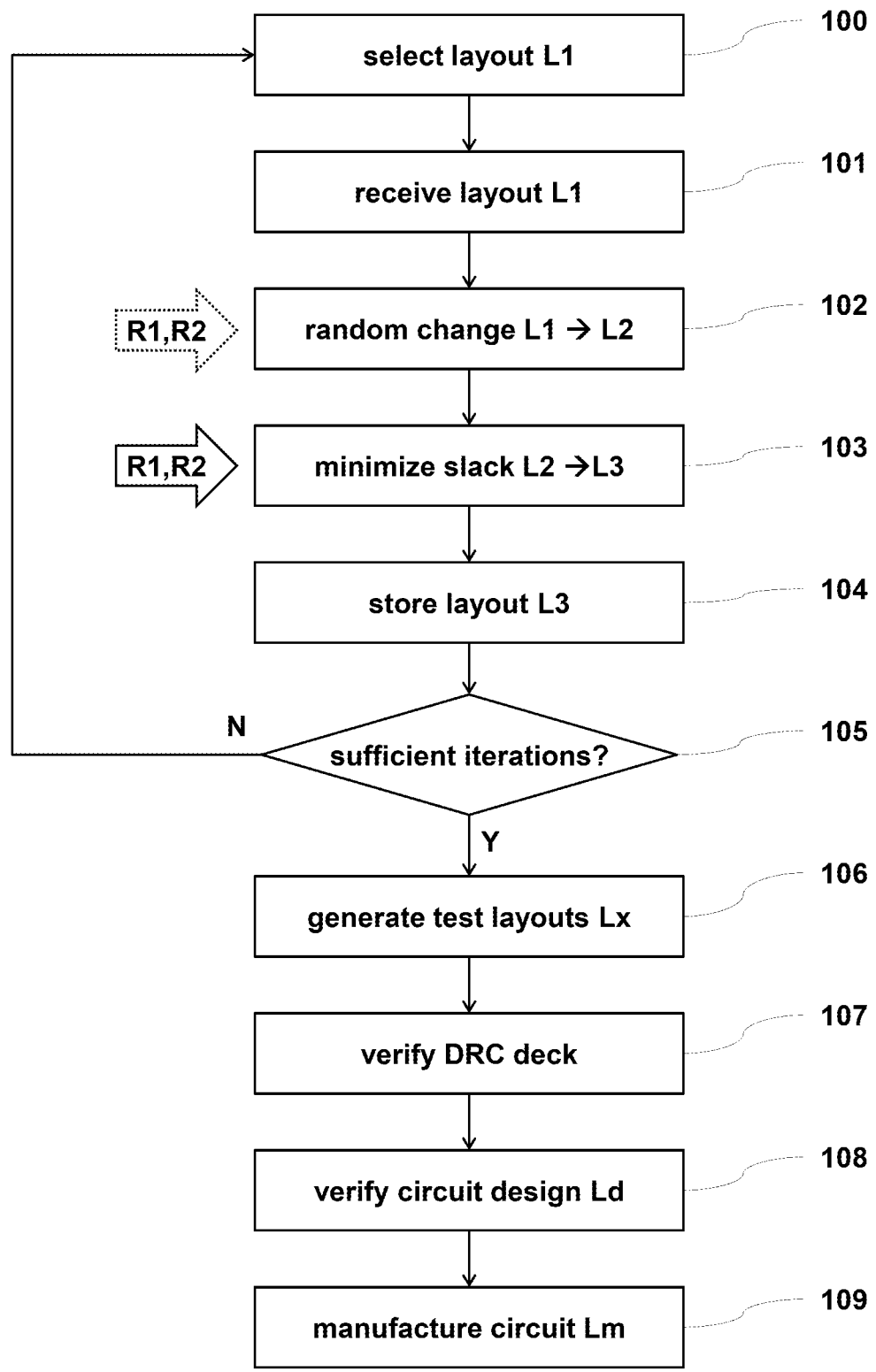
FIG. 8 schematically shows a flow diagram comprising a method for generating test layouts.

FIG. 8 schematically shows a flow diagram comprising a method for generating test layouts.

In one embodiment, the method comprises repeated iterations of receiving (step 101) a layout defined by the polygon parameters; randomly changing (step 102) at least on value of the polygon parameters; minimizing a slack (step 103) of the polygon parameters with respect to one or more of the parameter boundaries; and storing (step 104) the resulting layout as a further candidate test layout L3 for verifying a DRC deck. In one embodiment, the candidate test layout of an iteration is checked (step 105) against stored layouts of previous iterations, and wherein the repeating of iterations is halted if the number of newly found unique test layouts versus already previously found test layouts drops below a pre-set ratio.

In one embodiment, for at least one iteration following the first iteration, the layout that is received (selected in step 100) is the last stored layout of a previous iteration. In another or further embodiment, for at least one iteration following the first iteration, the layout that is received (selected in step 100) is the initial layout received during the first iteration. In another or further embodiment, for at least one iteration, the layout that is received 101 is randomly selected from one of the candidate test layouts Lx stored during a previous iteration.

According to one aspect, the present disclosure provides a method for verifying a DRC deck, comprising the automated generation of test layouts Lx according to steps 100-106; and verifying the DRC deck using the test layouts Lx according to step 107. According to a further aspect, the present disclosure provides a method for verifying a circuit design comprising verifying a DRC deck according to steps 100-107; and verifying the circuit design Ld with the verified DRC deck according to step 108. According to a further aspect, the present disclosure provides a method for manufacturing a circuit, comprising verifying a circuit design Ld according to steps 100-108; and manufacturing the circuit Lm according to step 109.

Aspects of the present disclosure may be implemented for example in a computer system for automated generation of test layouts Lx for verifying a DRC deck. In one embodiment, the computer system comprises a memory; and one or more processors coupled to the memory wherein the memory contains a set of instructions which, when executed by the one or more processors, cause the one or more processors to perform operations comprising the methods as described herein.

Aspects of the present disclosure may be implemented for example in a non-transitory computer storage medium encoded with a computer program, the computer program comprising a set of instructions which, when executed by one or more computers cause the one or more computers to perform operations comprising the methods as described herein.

Figure 9:
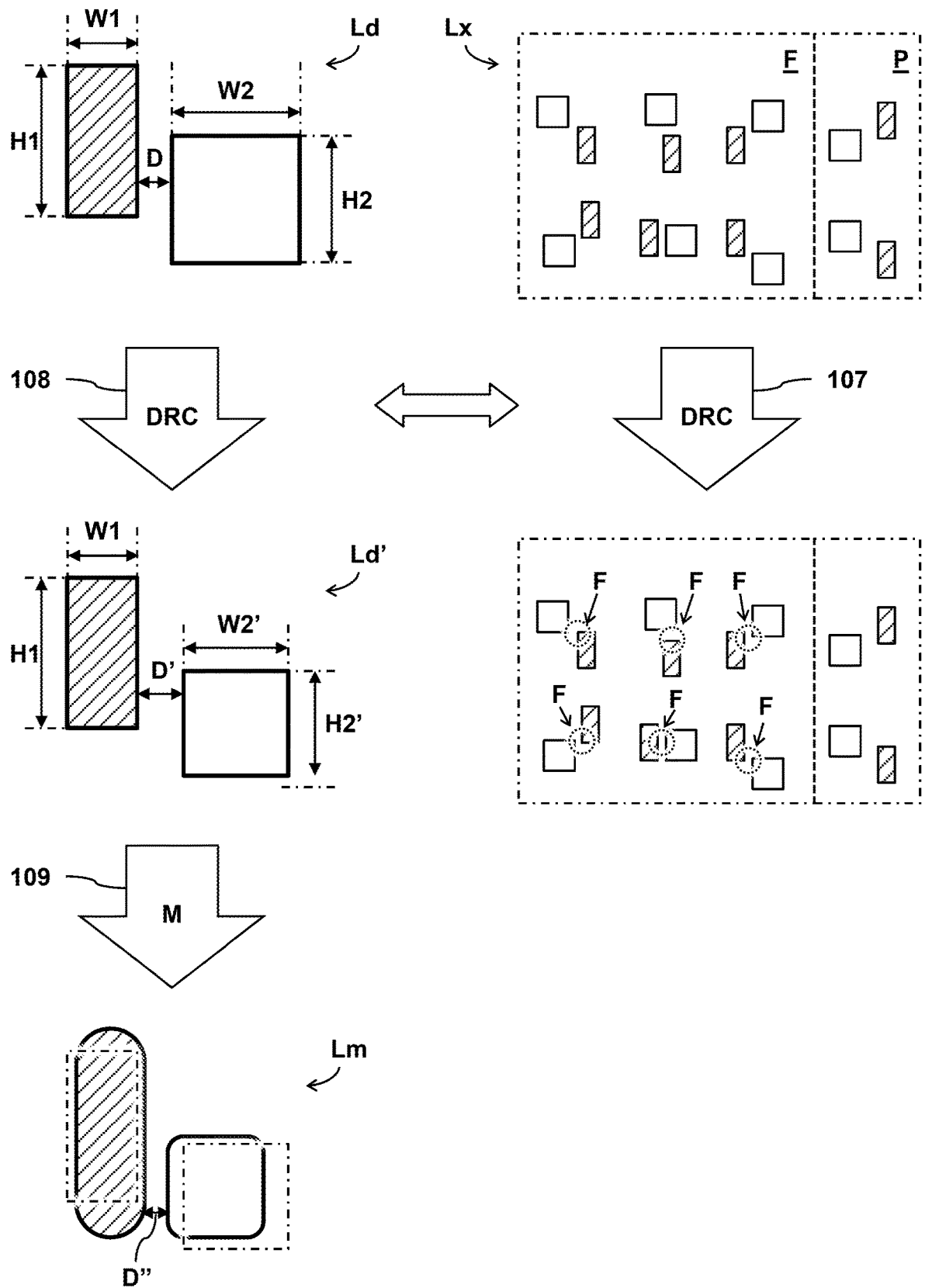
FIG. 9 schematically shows an example how test layouts can be used for verifying a DRC deck.

FIG. 9 schematically shows an example how test layouts Lx can be used for verifying a DRC deck. In one embodiment, the test layouts Lx are subjected to the DRC deck in step 107 to verify that the DRC deck indeed finds all fail cases in the region "F" and does not indicate fail cases in the region "P" of the test layouts Lx. In one embodiment, a circuit design Ld is then subjected to the verified DRC deck in step 108. This may lead e.g. to a redesign of the circuit with modified height H, width W, and/or distance D, until a verified circuit design Ld' is obtained. In one embodiment, the verified circuit design Ld' is manufactured (M) in step 109 resulting in manufactured circuit Lm. It may be noted that the manufactured circuit Lm may deviate from the designed circuit Ld', e.g. by a rounding of edges, slight displacements and/or re-dimensioning of the polygon shapes. However, the deviation should be within tolerance so as not to affect the functionality of the circuit.

It will be appreciated from the foregoing disclosure that the present methods are different from "Monte Carlo" generation methods where out of many possible generated test layouts a limited number of randomly selected ones are being used. In test layout generation, there are often a limited number of distances between points and/or edges which are of interest. For all these distances a range of discrete values can be used, and the total number of possible test layouts would be the Cartesian product of all these ranges. Since this can be a huge number the set is reduced by randomly taking values out of the Cartesian product. One notable advantage in the present approach is that there is no need for a user to indicate what distances are interesting (so there is also no chance for error that a user forgets to enter an interesting distance) nor there is a need to indicate the range, as all values (on some grid) are being tried. The interesting cases are selected by the optimization phase that is applied to each random generated layout. One advantage here is that this can all be automated, and the chance of missing interesting cases will be eliminated.

Finally, the above-discussion is intended to be merely illustrative of the present systems and/or methods and should not be construed as limiting the appended claims to any particular embodiment or group of embodiments. The specification and drawings are accordingly to be regarded in an illustrative manner and are not intended to limit the scope of the appended claims. In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. The mere fact that certain measures are recited in mutually different claims does not indicate that a combination of these measures cannot be used to advantage. In particular, all working combinations of the claims are considered inherently disclosed.

The invention claimed is:

1. A computer-implemented method for automated generation of test layouts for verifying a DRC deck, the method comprising:
    receiving a first layout comprising one or more polygon shapes defined by a plurality of polygon parameters, wherein the one or more polygon shapes represent circuit parts in one or more layers of a circuit design;
    receiving design rules comprising constraints on the polygon parameters, wherein each constraint defines a respective parameter boundary in a parameter space for the polygon parameters between a feasible region wherein the constraint holds and an infeasible region wherein the constraint is not satisfied;
    calculating a second layout by applying a random change of value to at least one of the polygon parameters of the first layout;
    calculating a third layout by varying values of the polygon parameters of the second layout until a respective slack of the polygon parameters with respect to one or more of the parameter boundaries is minimized, wherein the calculating of the third layout comprises calculating one or more slack variables of the constraints of the design rules as a function of the polygon parameters; and varying the values of the polygon parameters of the second layout towards minimizing an absolute value of the one or more slack variables; and
    storing the third layout as a candidate test layout for verifying the DRC deck.

2. The method according to claim 1, wherein in calculating the second layout, a random selection is made from at least a distance randomization, wherein a change of a polygon parameter alters a distance between edges of shapes in the second layout compared to the first layout.

3. The method according to claim 1, wherein the polygon parameters are prevented from crossing at least a subset of the parameter boundaries while minimizing the slack in order to obtain the third layout from the second layout.

4. The method according to claim 1, wherein
    before minimization, respective initial slacks of a plurality of constraints are calculated; and the minimizing is biased to vary the polygon parameters in the constraint with the lowest initial slack to minimize the lowest initial slack first.

5. The method according to claim 1, comprising repeated iterations of
receiving a layout defined by the polygon parameters;
randomly changing at least one value of the polygon parameters;
minimizing a slack of the polygon parameters with respect to one or more of the parameter boundaries; and
storing the resulting layout as a further candidate test layout.

6. The method according to claim 5, wherein the candidate test layout of an iteration is checked against stored layouts of previous iterations, and wherein the repeating of iterations is halted if the number of newly found unique test layouts versus already previously found non-unique test layouts drops below a pre-set ratio.

7. The method according to claim 5, wherein for at least one iteration, the first layout that is received is randomly selected from one of the candidate test layouts stored during a previous iteration.

8. The method according to claim 1, wherein after a number of iterations of finding and storing candidate test layouts, the stored candidate test layouts are filtered to generate a final set of test layouts, wherein the filtering comprises rejecting a test layout only if it is not part of a close pair of candidate test layouts, wherein an edge of a polygon shape is displaced by at most one minimum grid distance between the close pair of candidate test layouts, and wherein the close pair comprises both a pass and fail case of the design rules.

9. The method according to claim 1, wherein the layouts define polygon shapes in multiple layers, and one or more of the design rules are defined by constraints on a derived layer that is a Boolean combination of two or more of the multiple layers.

10. The method according to claim 1, wherein the constraints comprise manufacturability constraints defining minimum distances between edges of the one or more polygon shapes for verifying compliance of the integrated circuit design with a selected manufacturing process, wherein the parameter boundary indicate a crossing between a pass region and fail region of the design rules.

11. The method according to claim 1, wherein the constraints comprise topology constraints defining a sequence and/or number of edges of the one or more polygon shapes for preserving a relative layout of the one or more polygon shapes, wherein the parameter boundary indicate a crossing between different topologies of the polygon shapes.

12. The method according to claim 1, wherein in calculating the second layout, a random selection is made from at least a topology randomization, wherein a change of a polygon parameter alters a sequence of the polygon shapes in the second layout compared to the first layout.

13. The method according to claim 1, wherein in calculating the second layout, a random selection is made from at least a topology randomization, wherein a change of a polygon parameter alters the number of edges of the polygon shapes in the second layout compared to the first layout.

14. The method according to claim 1, wherein the random change comprises adding, subtracting, multiplying, or dividing a value of the polygon parameter by a random number chosen in a pre-selected range.

15. The method according to claim 14, wherein the pre-selected range is based on a scale of the second layout or a proximity of the second layout to a respective parameter boundary.

16. The method of claim 1, wherein the random change is based on a random generated number.

17. A computer system for automated generation of test layouts for verifying a DRC deck, the computer system comprising:
a memory; and
one or more processors coupled to the memory wherein the memory contains a set of instructions which, when executed by the one or more processors, cause the one or more processors to perform operations comprising
receiving a first layout comprising one or more polygon shapes defined by a plurality of polygon parameters, wherein the one or more polygon shapes represent circuit parts in one or more layers of a circuit design;
receiving design rules comprising constraints on the polygon parameters, wherein each constraint defines a respective parameter boundary in a parameter space for the polygon parameters between a feasible region wherein the constraint holds and an infeasible region wherein the constraint is not satisfied;
calculating a second layout by applying a random change of value to at least one of the polygon parameters of the first layout;
calculating a third layout by varying values of the polygon parameters of the second layout until a respective slack of the polygon parameters with respect to one or more of the parameter boundaries is minimized, wherein the calculating of the third layout comprises calculating one or more slack variables of the constraints of the design rules as a function of the polygon parameters; and varying the values of the polygon parameters of the second layout towards minimizing an absolute value of the one or more slack variables; and
storing the third layout as a candidate test layout for verifying the DRC deck.

18. A non-transitory computer storage medium encoded with a computer program, the computer program comprising a set of instructions which, when executed by one or more computers cause the one or more computers to perform operations comprising
receiving a first layout comprising one or more polygon shapes defined by a plurality of polygon parameters, wherein the one or more polygon shapes represent circuit parts in one or more layers of a circuit design;
receiving design rules comprising constraints on the polygon parameters, wherein each constraint defines a respective parameter boundary in a parameter space for the polygon parameters between a feasible region wherein the constraint holds and an infeasible region wherein the constraint is not satisfied;
calculating a second layout by applying a random change of value to at least one of the polygon parameters of the first layout;
calculating a third layout by varying values of the polygon parameters of the second layout until a respective slack of the polygon parameters with respect to one or more of the parameter boundaries is minimized, wherein the calculating of the third layout comprises calculating one or more slack variables of the constraints of the design rules as a function of the polygon parameters; and varying the values of the polygon parameters of the second layout towards minimizing an absolute value of the one or more slack variables; and storing the third layout as a candidate test layout for verifying the DRC deck.

\* \* \* \* \*